T. WATANABE.
DEVICE FOR STOPPING RUNAWAY HORSES.
APPLICATION FILED SEPT. 23, 1911.
1,026,012.
Patented May 14, 1912.
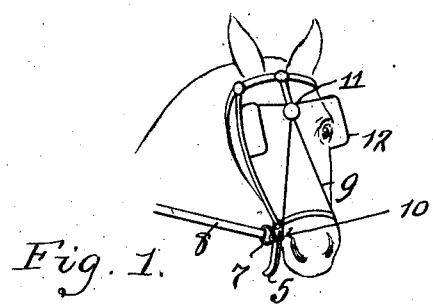
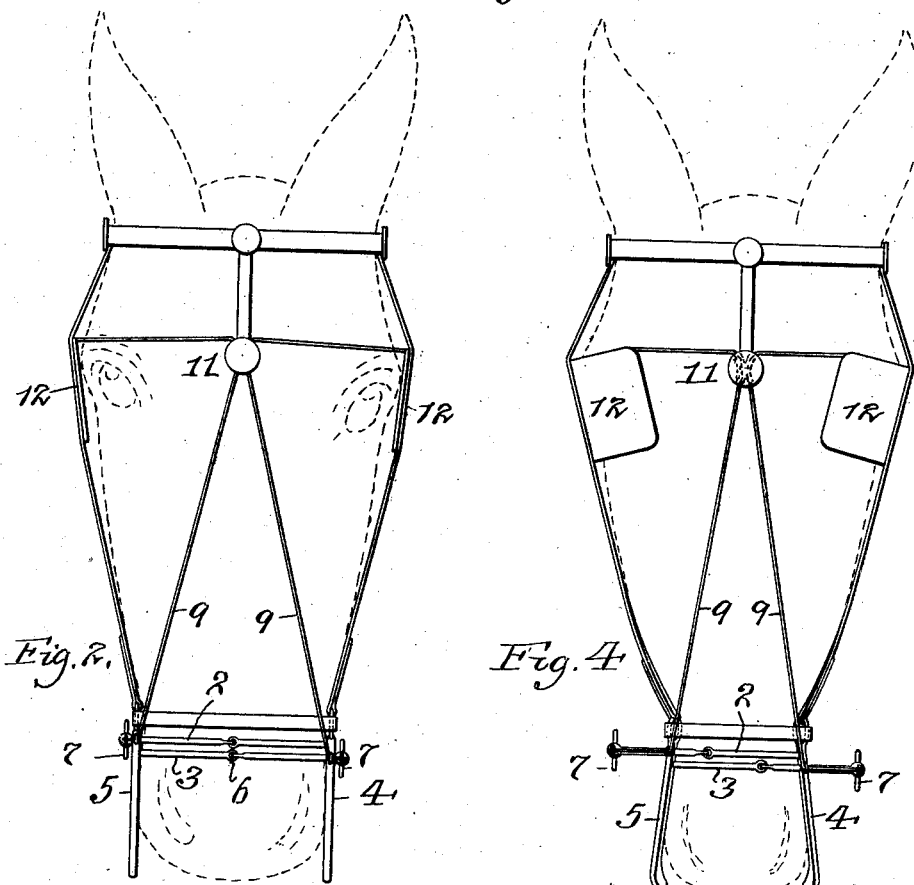
Witnesses:
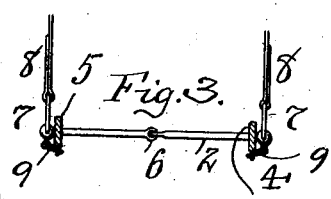
Inventor.
Tetsusaburo Watanabe
By his Attorney
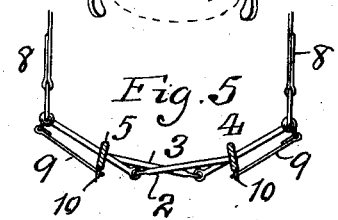

UNITED STATES PATENT OFFICE.

TETSUSABURO WATANABE, OF NEW YORK, N. Y.

DEVICE FOR STOPPING RUNAWAY HORSES.

1,026,012.   Specification of Letters Patent.   Patented May 14, 1912.

Application filed September 23, 1911. Serial No. 650,949.

*To all whom it may concern:*

Be it known that I, TETSUSABURO WATANABE, a subject of the Emperor of Japan, residing at New York, in the county of New York, and State of New York, have invented a certain new and useful Improvement in Devices for Stopping Runaway Horses, of which the following is a specification.

The invention is a device for stopping runaway horses, and consists in means combined with the headstall of the usual harness and actuated by the reins for closing the animal's nostrils, pinching its mouth and simultaneously bringing the blinders in front of its eyes.

In the accompanying drawings— Figure 1 is a perspective view showing my device in place on the horse's head. Fig. 2 shows the device, and Fig. 3 is a plan view of the bit, both under normal conditions. Fig. 4 shows the device, and Fig. 5 is a plan view of the bit, when said device is in operation. In Figs. 2 and 4, the horse's head is represented in dotted lines.

Similar numbers of reference indicate like parts.

The bit is supported in the animal's mouth by the headstall 1, in the usual way, and is formed of two bars, 2, 3, both of which are jointed in the middle, at 6. Bar 2 is rigidly secured at one end to a side or curb bar 4 supported by the headstall, and extends through an opening in side bar 5, in which opening it slides. Bar 3 is rigidly secured at one end to side bar 5, which is similarly supported, and extends through an opening in side bar 4, in which opening it slides. On the outer free ends of the bars 2 and 3 are rings 7, to which the reins 8 are attached. Fastened to each ring 7 is a cord 9. These cords pass through eye bolts 10 on the front edges of the side bars 4, 5, and then upward through openings (dotted lines Fig. 4) in a fair leader 11, which is suspended from the top band of the headstall, and finally are attached to the outer edges of the blinders 12 which are secured to the side straps of the headstall in the usual way.

Under ordinary conditions, the blinders 12 stand at a distance from the horse's eyes, as shown in Fig. 1, and the two bit bars 2, 3 lie straight or nearly straight across the animal's mouth, this state of affairs continuing as long as no strong strain is put on the reins. Should the horse try to run away or bolt, the driver pulls hard on the reins, the effect of which is to draw bit bar 2 through side bar 5 and bit bar 3 through side bar 4, so that the two side bars 4, 5 are brought nearer together and caused severely to squeeze the horse's mouth and nose between them, as shown in Fig. 4. At the same time the cords 9, which are pulled through the eye bolts 10, draw the blinders 12 over the animal's eyes. The effect is simultaneously to blindfold the horse, close his nostrils and pinch his mouth, in which circumstances no horse will continue to run.

I claim:

1. In combination with a supporting headstall, blinders thereon, two side bars respectively on opposite sides of said headstall, a bit between said side bars, and reins connected to said bit, means operated by said reins for simultaneously moving said side bars toward one another to compress the horse's mouth between them, and said blinders toward one another to cover the horse's eyes.

2. In combination with a supporting headstall, and blinders thereon, two side bars, each having an opening, two jointed bit bars, each secured at one end to one side bar and extending through the opening in the other side bar, reins attached to the free ends of said bit bars, and cords connected to said free ends and to said blinders.

3. In combination with a supporting headstall, and blinders thereon, two side bars, each having an opening, two jointed bit bars, each secured at one end to one side bar and extending through the opening in the other side bar, reins attached to the free ends of said bit bars, a fair leader suspended from the upper headstall strap, and having openings, and cords connected to the free ends of said bit bars, passing through said fair leader openings and secured to said blinders.

In testimony whereof I have affixed my signature in presence of two witnesses.

TETSUSABURO WATANABE.

Witnesses:
GERTRUDE T. PORTER,
MAY T. MCGARRY.

Copies of this patent may be obtained for five cents each, by addressing the "Commissioner of Patents, Washington, D. C."